(12) United States Patent
Iwahashi (10) Patent No.: US 8,730,333 B2
(45) Date of Patent: May 20, 2014

(54) IMAGE STABILIZATION SYSTEM

(75) Inventor: Kenji Iwahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 13/604,518

(22) Filed: Sep. 5, 2012

(65) Prior Publication Data

US 2012/0327254 A1 Dec. 27, 2012

Related U.S. Application Data

(63) Continuation of application No. PCT/JP2011/000338, filed on Jan. 21, 2011.

(30) Foreign Application Priority Data

Mar. 10, 2010 (JP) ................................ 2010-052647

(51) Int. Cl.
*H04N 5/228* (2006.01)
*H04N 11/04* (2006.01)
*H04N 5/225* (2006.01)
*G06K 9/00* (2006.01)
*H04N 7/12* (2006.01)

(52) U.S. Cl.
USPC ............. 348/208.4; 348/208.99; 348/208.14; 348/402.1; 348/169; 348/155; 382/103; 382/197; 382/107; 382/236; 375/240.16; 375/240.22

(58) Field of Classification Search
CPC ....... H04N 5/228; H04N 5/225; H04N 11/04; H04N 7/12; G06K 9/00
USPC ........... 348/208.99, 208.4, 208.14, 169, 170, 348/402.1, 413.1, 416.1, 417, 155; 382/103, 197, 107, 236; 375/240.16, 375/240.22

See application file for complete search history.

(56) References Cited

U.S. PATENT DOCUMENTS

| | | | |
|---|---|---|---|
| 5,317,685 A * | 5/1994 | Morimura et al. | 345/474 |
| 7,852,375 B2 * | 12/2010 | Vella et al. | 348/208.99 |
| 8,094,714 B2 * | 1/2012 | Nakazato et al. | 375/240.01 |
| 2009/0256918 A1 * | 10/2009 | Rabinowitz et al. | 348/208.4 |
| 2009/0290809 A1 * | 11/2009 | Yamada | 382/266 |

FOREIGN PATENT DOCUMENTS

| | | | |
|---|---|---|---|
| JP | 61-269475 A | 11/1986 | |
| JP | 2-157980 A | 6/1990 | |

(Continued)

OTHER PUBLICATIONS

International Search Report issued in International Application No. PCT/JP2011/000338 issued on Mar. 22, 2011.

*Primary Examiner* — Lin Ye
*Assistant Examiner* — Marly Camargo
(74) *Attorney, Agent, or Firm* — McDermott Will & Emery LLP (57) ABSTRACT

An image stabilization system includes: a region vector detection unit configured to detect a motion vector of each of a plurality of regions in an image; a reliability determination unit configured to determine reliability of the motion vector of each of the regions; a region indicator configured to indicate, to the region vector detection unit, a new detection target region instead of a region whose motion vector is determined to have low reliability; an image vector computing unit configured to compute a motion vector of the entire image using a motion vector determined to have high reliability; and a stabilization unit configured to move an entire image to be output according to the motion vector of the entire image to compensate for sway of the image.

15 Claims, 11 Drawing Sheets

(56) References Cited

FOREIGN PATENT DOCUMENTS

| | | | |
|---|---|---|---|
| JP | 4-029477 | A | 1/1992 |
| JP | 7-135598 | A | 5/1995 |
| JP | 2003-078807 | A | 3/2003 |
| JP | 2008-048152 | A | 2/2008 |

* cited by examiner

IMAGE STABILIZATION SYSTEM

CROSS-REFERENCE TO RELATED APPLICATION

This is a continuation of PCT International Application PCT/JP2011/000338 filed on Jan. 21, 2011, which claims priority to Japanese Patent Application No. 2010-052647 filed on Mar. 10, 2010. The disclosures of these applications including the specifications, the drawings, and the claims are hereby incorporated by reference in their entirety.

BACKGROUND

The present disclosure generally relates to a system for detecting a motion vector of an entire screen caused by vibration or shake of a monitoring camera based on an image signal, and a system for compensating for unwanted sway in an entire screen caused by vibration or shake of a monitoring camera.

Figure 10:
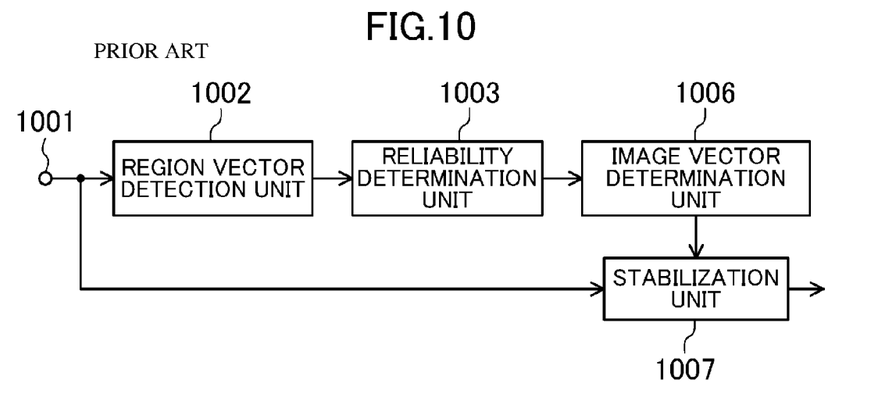
FIG. 10 is a block diagram illustrating a configuration of an image stabilization system employing a conventional motion vector detector.

FIG. 10 is a block diagram illustrating an image stabilization system employing a conventional motion vector detector. Reference character 1001 denotes an input terminal of an image signal. Reference character 1002 denotes a region vector detection unit for each detection region. Reference character 1003 denotes a vector reliability determination unit. Reference character 1006 denotes an image vector determination unit. Reference character 1007 is a stabilization unit.

Figure 11:
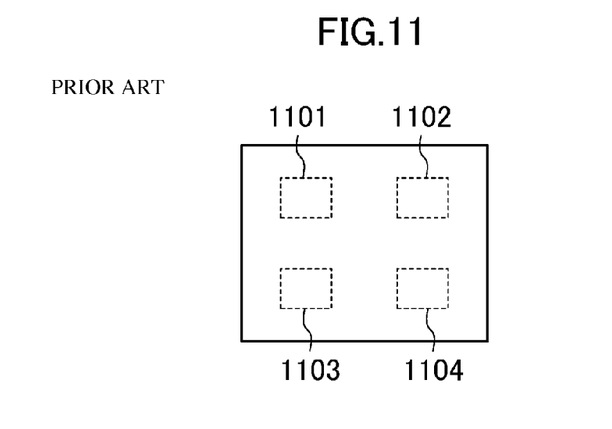
FIG. 11 is a view showing detection regions for which motion vectors are detected in the image stabilization system illustrated in FIG. 10.
Figure 12:
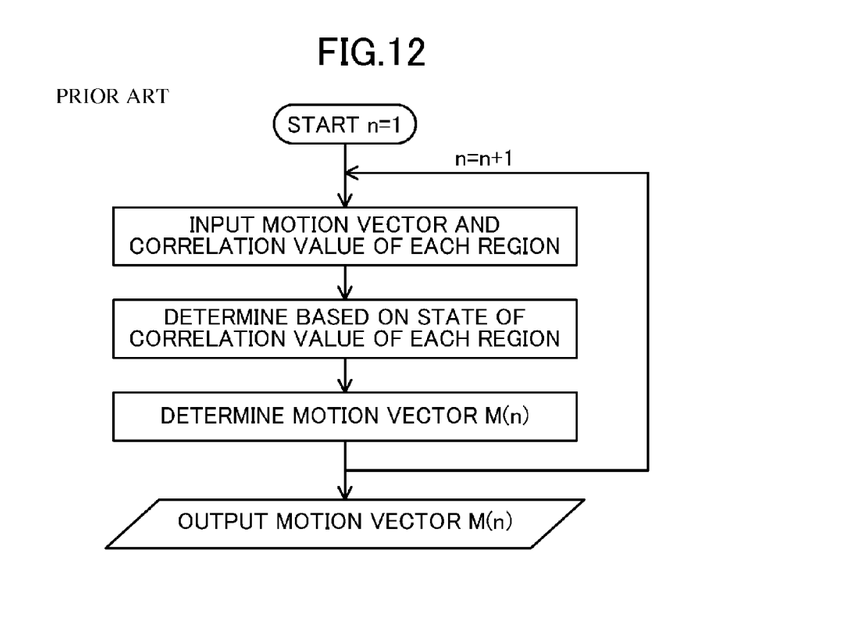
FIG. 12 is a flowchart showing operation of the image stabilization system illustrated in FIG. 10.
Figure 13:
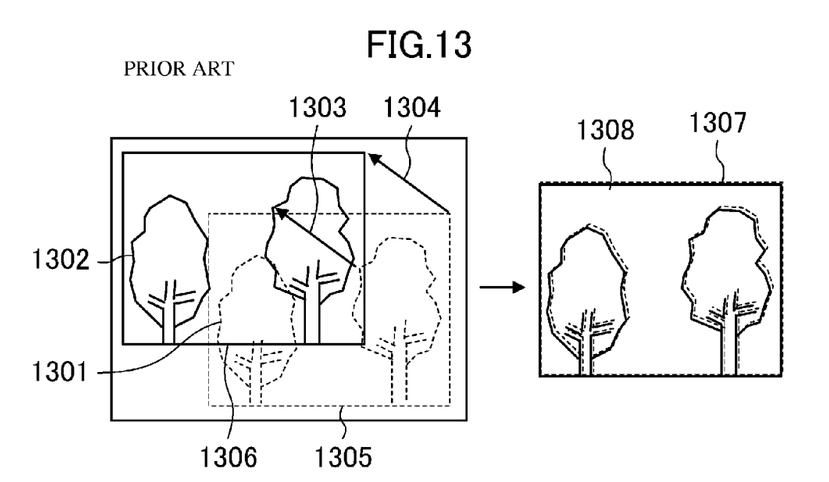
FIG. 13 is a view for describes how sway of an image is compensated for by the image stabilization system illustrated in FIG. 10.

In the image stabilization system with the above configuration, image signals of at least two successive frames are first input to the input terminal 1001. In the region vector detection unit 1002 for each detection region, four vector detection regions 1101, 1102, 1103, and 1104 are defined beforehand in an image as shown in FIG. 11, and for each of the detection regions of two frames, the differences $\Sigma|\Delta L(i, j)|$ between a signal before a shift by predetermined values (i, j) (where imin<i<imax, jmin<j<jmax) and a signal after the shift are obtained as correlation values. Then, the minimum values (i', j') of the correlation values are detected, and used as a vector of a detection region. In addition, the minimum, average, and maximum values of the correlation value are obtained, and output to the reliability determination unit 1003 and the image vector determination unit 1006, together with the vector. As shown in the flowchart of FIG. 12, the reliability determination unit 1003 and the image vector determination unit 1006 determine the reliability of a vector based on the minimum, average, and maximum values of the correlation value of each region, and if the vectors of at least two regions determined to have reliability match each other, the average value of these vectors is determined as a motion vector of an entire screen, and is output. On the other hand, if these vectors do not match each other, a zero vectors is output. The stabilization unit 1007 includes a storage means for storing image signals of one or more frames. Sway is compensated by controlling the read-out location at which an image signal is read out from the storage means. Specifically, as shown in FIG. 13, when an image showing a large degree of sway is input, for input image signals of the (n−1)th frame 1301 and the n-th frame 1302, based on a motion vector 1303 input from the image vector determination unit 1006, a screen of an image signal which is to be read out in a direction 1304 in which a motion in the screen is compensated for is moved in parallel from a position 1305 to a position 1306. The screen is subjected to operations such as enlargement by, for example, interpolation, and image signals 1307 and 1308 each corresponding to the size of one screen and showing a small degree of sway are output (see, for example, Patent Japanese Patent Publication No. S61-269475).

The above-described technique determines the reliability of a vector based on the minimum, average, and maximum values of a correlation value. There are also other techniques for determining the reliability of a vector based on the state of a correlation value, such as a technique using the difference between the minimum value of the correlation value and a vicinity value of the minimum value, i.e., a gradient around the minimum value, and a technique using only the minimum value. There is also a technique in which the reliability of a vector is determined in term of weight, and a weighted mean of vectors is output as a motion vector in an entire screen.

Figure 14:
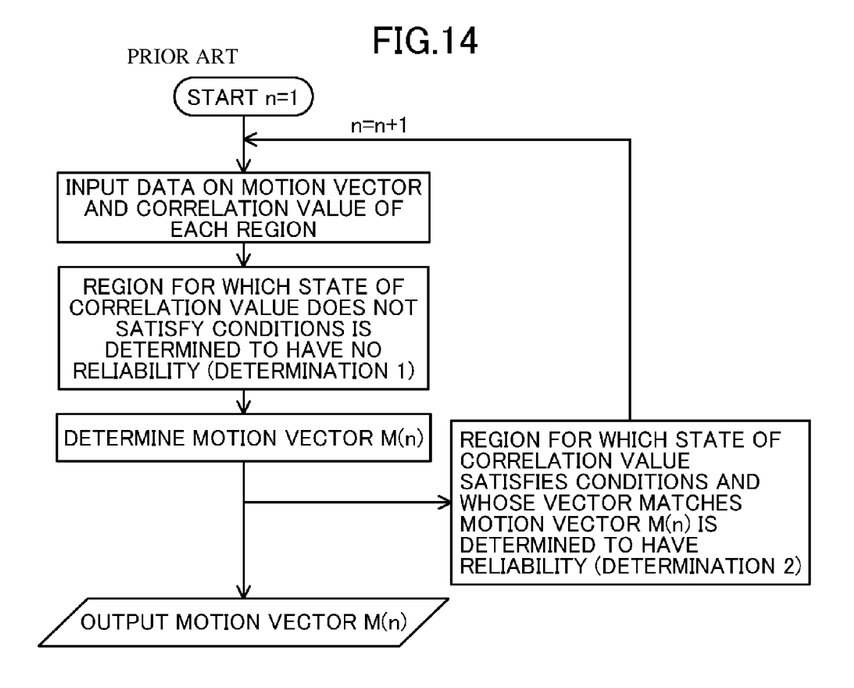
FIG. 14 is a flowchart showing operation of another conventional image stabilization system.
Figure 15:
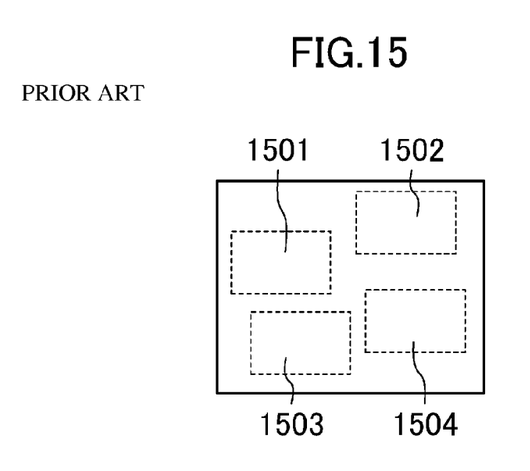
FIG. 15 is a view showing an example arrangement of detection regions of the image stabilization system illustrated in FIG. 14.

In addition, in a conventional motion vector detector, when a moving object enters a screen, a zero vector is output or a vector to which motion of the moving object is added is detected in many cases. In view of this, a conventional stabilization system is configured to prevent an image from being corrected in a direction different from a direction intended by a camera operator because of interruption of correction or detection of a vector to which motion of the moving object is added. Specifically, as shown in a flowchart of FIG. 14, a plurality of detection regions are provided in a screen so that a motion vector is obtained for each of the detection regions and the reliability of the motion vector is determined. Then, based on the degree of matching with a motion vector of the entire screen, the determination result is changed from the absence of reliability to the presence of reliability so that the reliability of the motion vector is determined. In addition, as shown in FIG. 15, in another conventional stabilization system, a plurality of detection regions 1501, 1502, 1503, and 1504 are arranged in a staggered pattern not to be aligned in any of a vertical direction or a transverse direction, motion vectors are obtained for these detection regions, and the reliabilities of the motion vectors are determined. In this manner, even when a moving object passes through the screen, image stabilization in terms of time is not interrupted, and a malfunction in which an image is corrected in a direction not intended by a camera operator (see, for example, Japanese Patent Publication No. H02-157980).

SUMMARY

However, in the configurations as described above, in a case where a camera is fixed at a position, there occurs a problem in which compensation cannot be performed normally because of a zero vector which is output when detection regions always have low reliability and/or detection of a vector to which a major error is added.

In addition, in a case where an entire screen is moved such as a case where a camera revolves, a vector to which the motion amount of revolution of the camera is added is detected, resulting in a malfunction in which the screen is corrected in an unintended direction.

It is therefore an object of the present disclosure to provide an image stabilization system which can normally compensate for sway of an entire image based on a motion vector of the entire image with high reliability.

An example image stabilization system includes: a region vector detection unit configured to detect a motion vector of each of a plurality of regions in an image; a reliability determination unit configured to determine reliability of the motion vector of each of the regions; a region indicator configured to indicate, to the region vector detection unit, a new detection target region instead of a region whose motion vector is determined to have low reliability; an image vector computing unit configured to compute a motion vector of the entire image using a motion vector determined to have high reliability; and a stabilization unit configured to move an entire image to be output according to the motion vector of the entire image to compensate for sway of the image.

In this image stabilization system, if a motion vector of a region has low reliability, detection of a motion vector of a new detection target region and determination of reliability thereof are repeated. Accordingly, the reliability of a motion vector detected for each region can be enhanced, thereby enhancing the reliability of a computed motion vector of the entire image.

Preferably, the image stabilization system further includes: a revolution determination unit configured to determine whether an image capturing device configured to generate an image to be input to the image stabilization system is revolving or not; and a revolution vector computing unit configured to compute a motion vector of the image resulting from revolution of the image capturing device, the revolution vector computing unit computing a motion vector based on a motion vector computed by the image vector computing unit and a motion vector immediately previously computed by the revolution vector computing unit, and the stabilization unit compensates for sway of the image by adding the motion vector computed by the revolution vector computing unit.

In this image stabilization system, a motion vector only of shake of a camera can be obtained by using the difference between a motion vector to which the motion amount of revolution of the camera obtained when an entire screen moves in revolution of the camera is added and a motion vector of revolution of the camera. Thus, sway can be normally compensated for even in revolution of the camera. This can eliminate the need for vibration isolation design by precisely performing mechanical control of camera revolution at a constant speed, thus achieving cost reduction.

Alternatively, the image stabilization system may include an external information acquisition unit configured to acquire external information input to an image capturing device configured to generate an image to be input to the image stabilization system. In this case, the region indicator may determine the new detection target region based on the external information.

DETAILED DESCRIPTION

Figure 1:
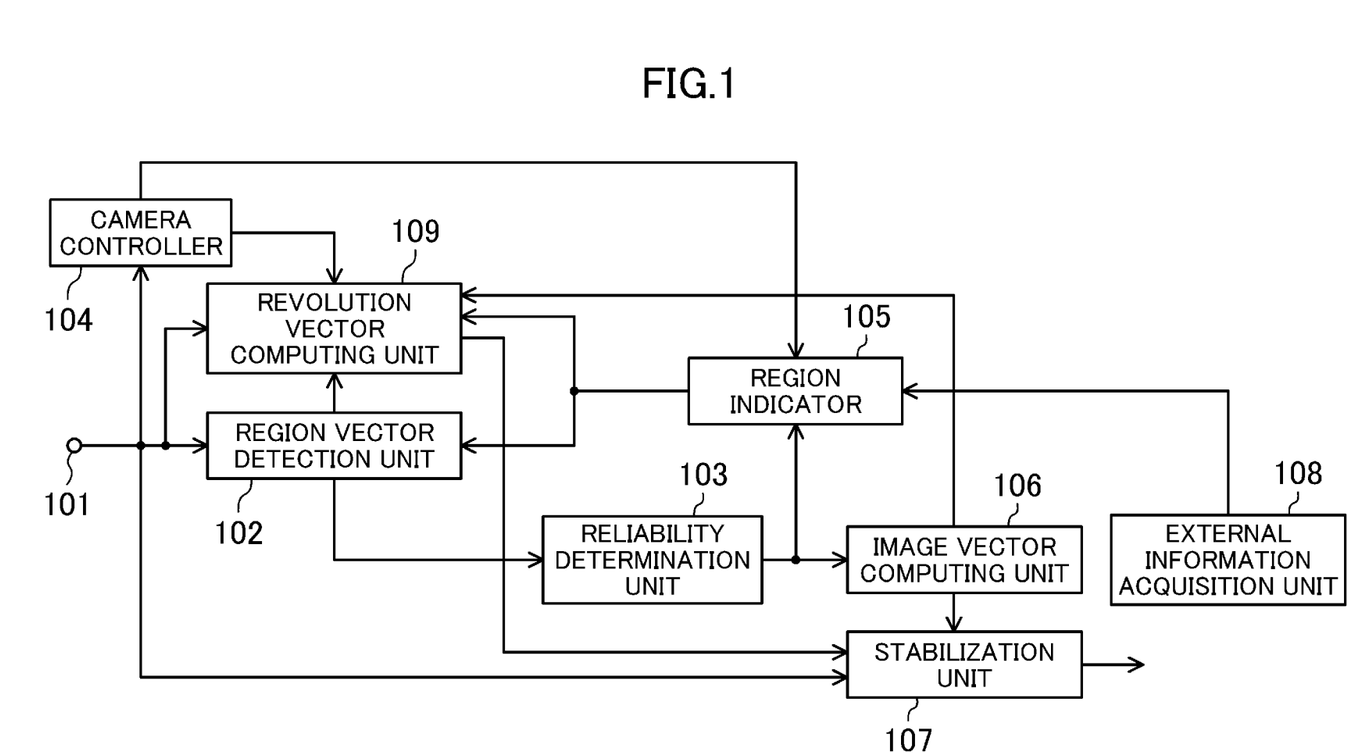
FIG. 1 is a block diagram illustrating a configuration of an image stabilization system according to an embodiment of the present disclosure.

FIG. 1 is a block diagram illustrating an image stabilization system according to an embodiment of the present disclosure. The image stabilization system of this embodiment can compensate for sway of an image input from a camera as an image capturing device.

An image taken by a camera is input to an input terminal 101. A region vector detection unit 102 detects motion vectors of a plurality of detection regions in the image. A reliability determination unit 103 determines the reliabilities of the motion vectors of the detection regions.

A camera controller 104 acquires frequency components of a plurality of regions in the image based on, for example, autofocus (hereinafter referred to as "AF") information of the camera. The camera controller 104 may also acquire luminance information of a plurality of regions in the image based on auto-exposure (hereinafter referred to as "AE") information of the camera. The camera controller 104 may also acquire white balance information of the camera. Alternatively, in a case where the camera is configured to revolve by mechanical control with a motor or the like, the camera controller 104 may acquire information on whether the camera is revolving or not.

A region indicator 105 indicates a new detection target region, instead of a detection region whose motions vector is determined to have no reliability by the reliability determination unit 103, to the region vector detection unit 102. The region indicator 105 may determine a region where the frequency component or the luminance acquired by the camera controller 104 is relatively high to have reliability, and indicate this region as a new detection target region. Alternatively, the region indicator 105 may indicate a new detection target region based on external information acquired by an external information acquisition unit 108.

An image vector computing unit 106 computes a motion vector of the entire image using motion vectors determined to have reliability by the reliability determination unit 103. A stabilization unit 107 moves an entire image to be output according to the motion vector of the entire image to compensate for sway of the image.

The external information acquisition unit 108 acquires external information such as time, weather, and the direction and quantity of the wind input to the camera. A revolution vector computing unit 109 computes a motion vector of the image resulting from revolution of the camera. Specifically, if the camera controller 104 determines that the camera is revolving, the revolution vector computing unit 109 computes a new vector based on the vector previously computed by the revolution vector computing unit 109 itself and the vector computed by the image vector computing unit 106. The revolution vector computing unit 109 may compute a vector from when the camera is instructed to stop its revolution to when the camera actually stops its revolution. In this manner, a minute motion vector resulting from removal of the inertial force of a device controlling revolution of the camera can be computed.

Figure 2:
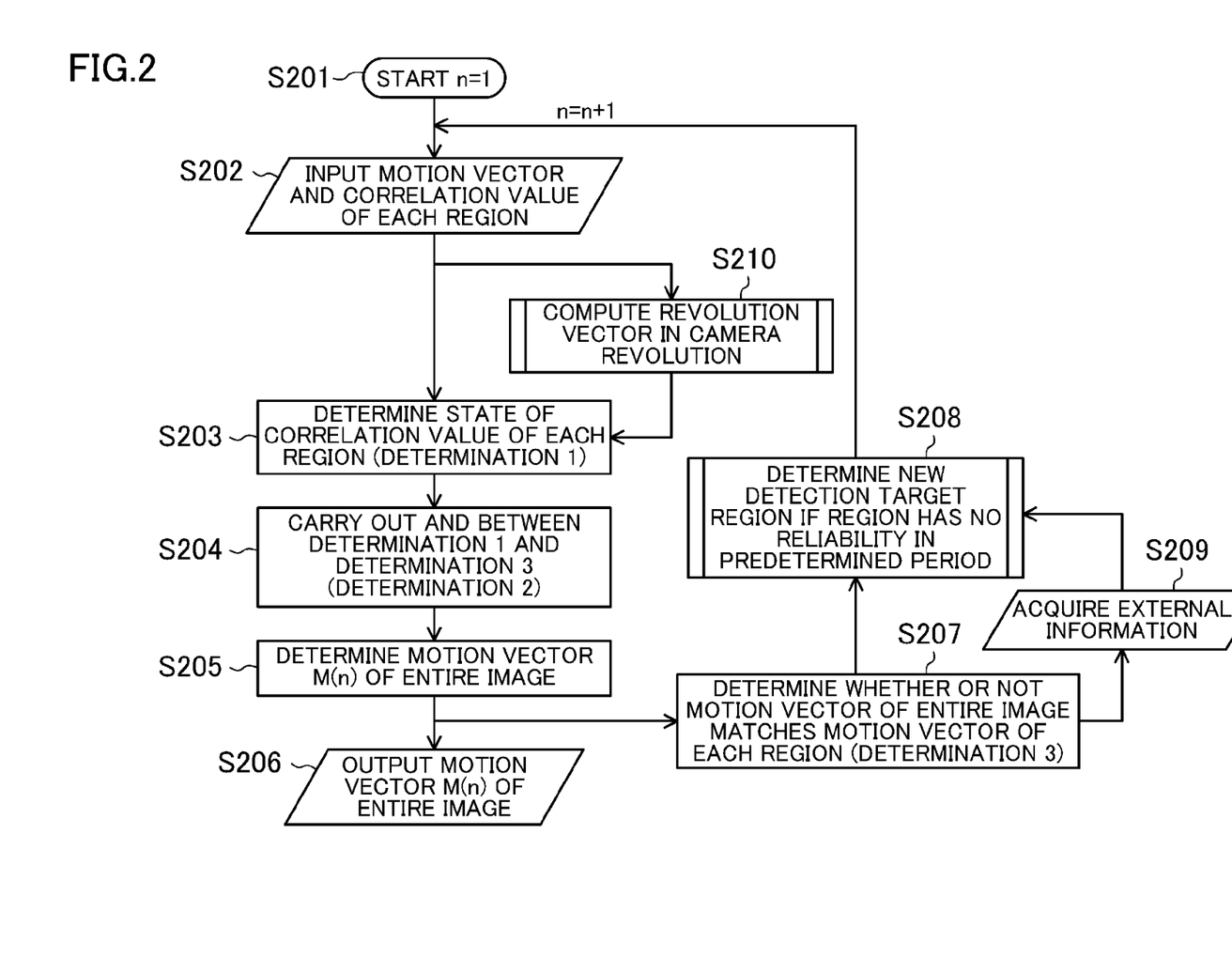
FIG. 2 is a flowchart showing operation of the image stabilization system illustrated in FIG. 1.

Referring now to FIG. 2, operation in a case where a captured image to be input changes depending on an external factor will be described. In step S201, an image signal at the n-th frame is input from the input terminal 101. In step S202, a correlation value of a motion vector of each region is acquired by the region vector detection unit 102. In step S203, the reliability determination unit 103 determines the state of the correlation value of each region, and regions not satisfying conditions are determined to have no reliability (determination 1). Then, in step S204, the AND between a vector of a region determined to have reliability and a result of determination 3 on the previous frame as described later is carried out, and only regions determined to have reliability in both determinations 1 and 3 are determined to have reliability in determination 2. It should be noted that no results of determination 3 on the previous frame are obtained in the first frame, and thus, the result of determination 2 is the same as that of determination 1. Thereafter, in step S205, an intermediate value (i.e., a value of a motion vector located at the middle of motion vectors arranged in the order of magnitude, or the average value of two motion vectors closest to the middle in a case where an even number of motion vectors are arranged) of motion vectors of regions determined to have reliability in determination 2 is determined as a motion vector of the entire image. The motion vector of the entire image is fed back to reliability determination 3 on vectors of regions in step S207. In determination 3, regions for each of which a motion vector matches the fed-back motion vector within a predetermined range and is determined to have reliability in determination 1 are determined to have reliability. This result is used for determination 2 in the next frame. Subsequently, in step S208, if a region which is determined to have no reliability in determination 3 is determined to have no reliability in a predetermined period, this region is determined to be inappropriate as a detection region of a motion vector. Then, a region whose frequency component, for example, acquired by the camera controller 104 is relatively high is determined as a new detection target region. However, since the first frame after determination of the new detection target region does not have a normal value because a vector of an image before the determination is detected, the new detection target region is determined to have no reliability in determination 3, thereby performing normal processing from the second frame after the determination of the new detection target region.

Figure 3:
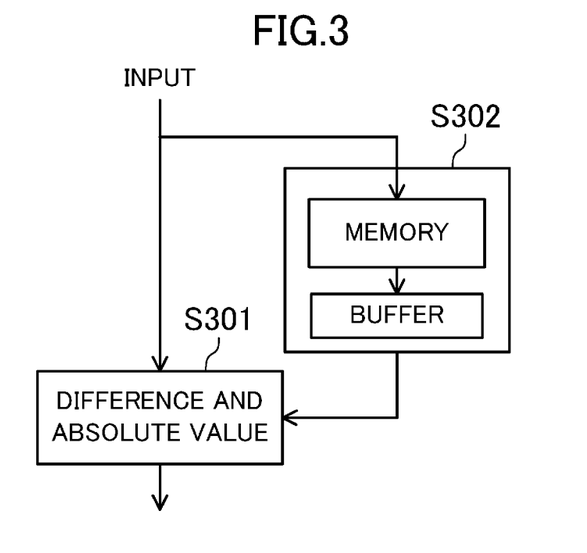
FIG. 3 is a flowchart showing operation of a region vector detection unit illustrated in FIG. 1.
Figure 4:
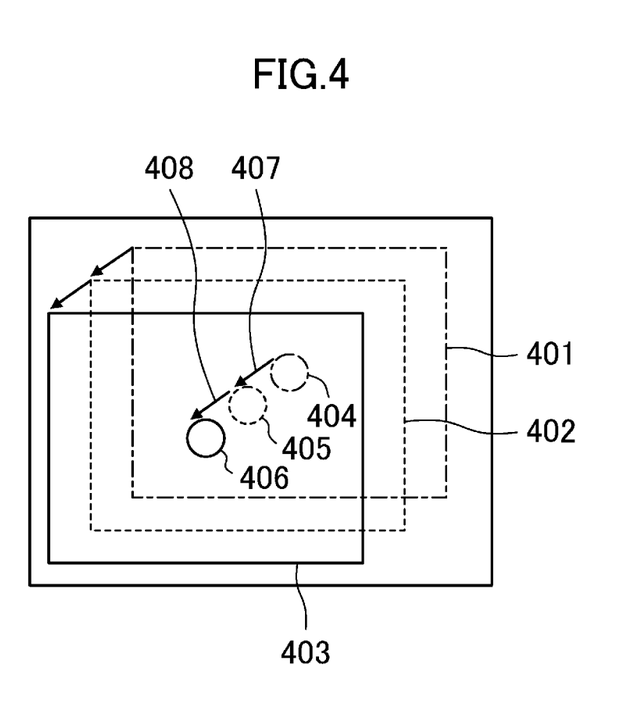
FIG. 4 is a view for describing motion vectors.
Figure 5:
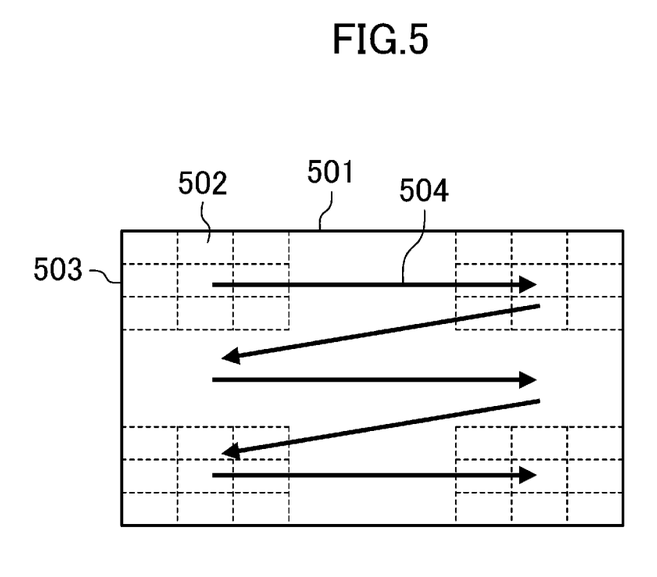
FIG. 5 is a view for describing a method for acquiring autofocus information by the image stabilization system illustrated in FIG. 1.

Referring now to FIG. 3, a method for detecting a vector of each detection region in step S202 will be described. In step S301, an image and information on a representative point memory in the previous input are input, and a motion vector is detected based on the difference between the previous representative point and the current representative point. At this time, the current representative point is stored at step S302, and is used in the next input. Motion vectors are described with reference to FIG. 4. In FIG. 4, reference character 401 denotes an image in the n-th frame, reference character 402 denotes an image in the (n+1)th frame, reference character 403 denotes an image in the (n+2)th frame, reference character 404 denotes a representative point of an image in the n-th frame, reference character 405 denotes a representative point of an image in the (n+1)th frame, and reference character 406 denotes a representative point of an image in the (n+2)th frame. Reference characters 407 and 408 are motions vectors between frames detected in the (n+1)th frame and the (n+2)th frame, respectively. Then, a method for acquiring AF information and a method for determining a new detection target region in step S208 will be described. In FIG. 5, reference character 501 denotes an entire input image, reference character 502 denotes an AF box, and reference character 503 denotes a region where nine boxes are defined when the maximum number of AF boxes is nine. As indicated by arrows 504, nine boxes are moved one frame by one frame of the input image, thereby acquiring a frequency component of the entire image after several frames (i.e., one frame or more).

Acquisition information of AF does not need to be acquired from the entire image, and may be acquired from a specific region.

Figure 6:
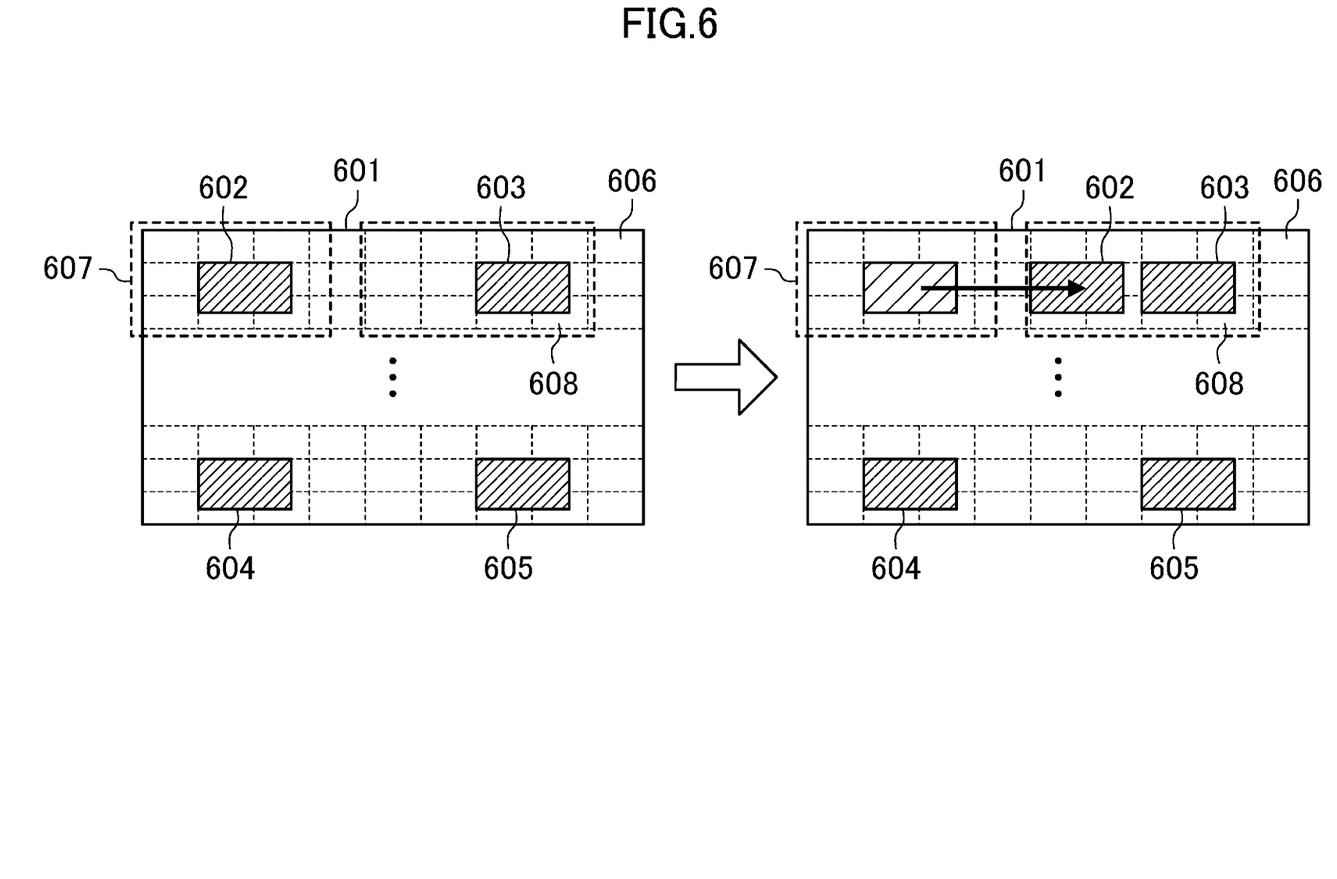
FIG. 6 is a view for describing a method for determining a new detection target region by the image stabilization system illustrated in FIG. 1.

Then, a method for determining a new detection target region based on the acquired frequency component will be described. In FIG. 6, reference character 601 denotes an entire input image, reference characters 602, 603, 604, and 605 denote detection regions, and reference character 606 denotes an AF box acquired by the method shown in FIG. 5. Specifically, suppose that a region 607 is a low-contrast region having a low frequency component based on AF information and the detection region 602 has no reliability, and that a region 608 is a high-contrast region having a high frequency component based on AF information. Then, in step S208, a region which is a high-contrast region based on AF information and does not overlap other detection regions is determined as a new detection target region replacing the detection region 602.

In the case of low-light or high-light conditions below or above threshold values of low-light and high-light which are set using luminance information such as AE in addition to AF information and a case where a detection region has no reliability, a region whose luminance is within the threshold values may be determined as a new detection target region.

Figure 7:
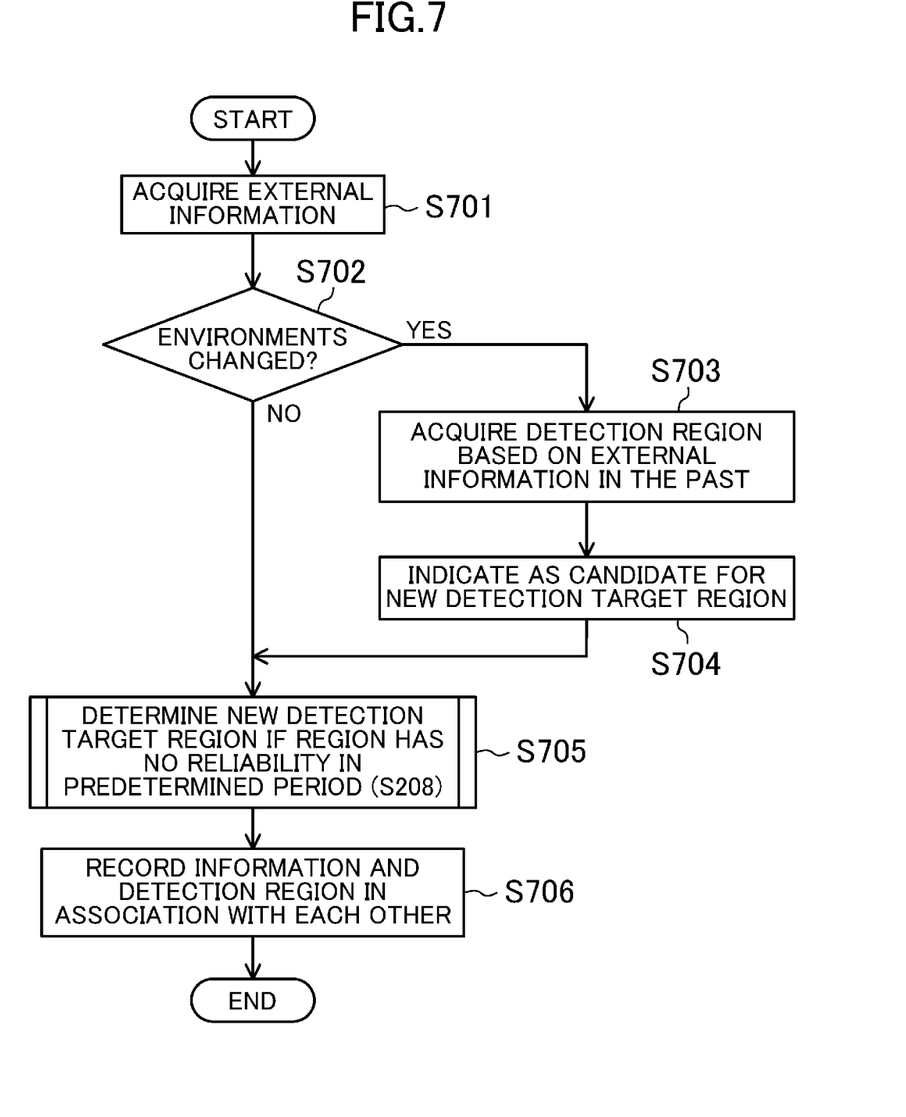
FIG. 7 is a flowchart showing operation in a case where external information is acquired by an external information acquisition unit illustrated in FIG. 1.

Referring now to FIG. 7, the case of using external information acquired in step S209 will be described as a method for determining a new detection target region without using information from the camera controller 104. In step S701, external information such as time, weather, and the direction and quantity of the wind is acquired by the external information acquisition unit 108. In step S702, based on a result of the acquired information, it is determined whether surrounding environments of the camera changed or not (e.g., whether a captured image changed or not with time according to sunshine conditions and lighting in the case of time and weather information, and whether motion of a flag, cloths, or the like in a captured image changed or not according to the wind in the case of the direction and quantity of the wind). If the surrounding environments did not change, in step S705, a new detection target region is determined based on the reliability (processing in step S208). In step S706, external information and location information of a detection region having reliability are recorded in association with each other. On the other hand, if the surrounding environments changed, in step S703, a detection region having the highest reliability among detection regions whose external information matches the current external information is acquired from a history recorded in step S706. In step S704, the acquired detection region is indicated as a candidate for a new detection target region. In step S705, if the indication is provided, the indicated detection region is determined as a new detection target region, instead of a detection region which has been determined to have no reliability in a predetermined period.

Figure 8:
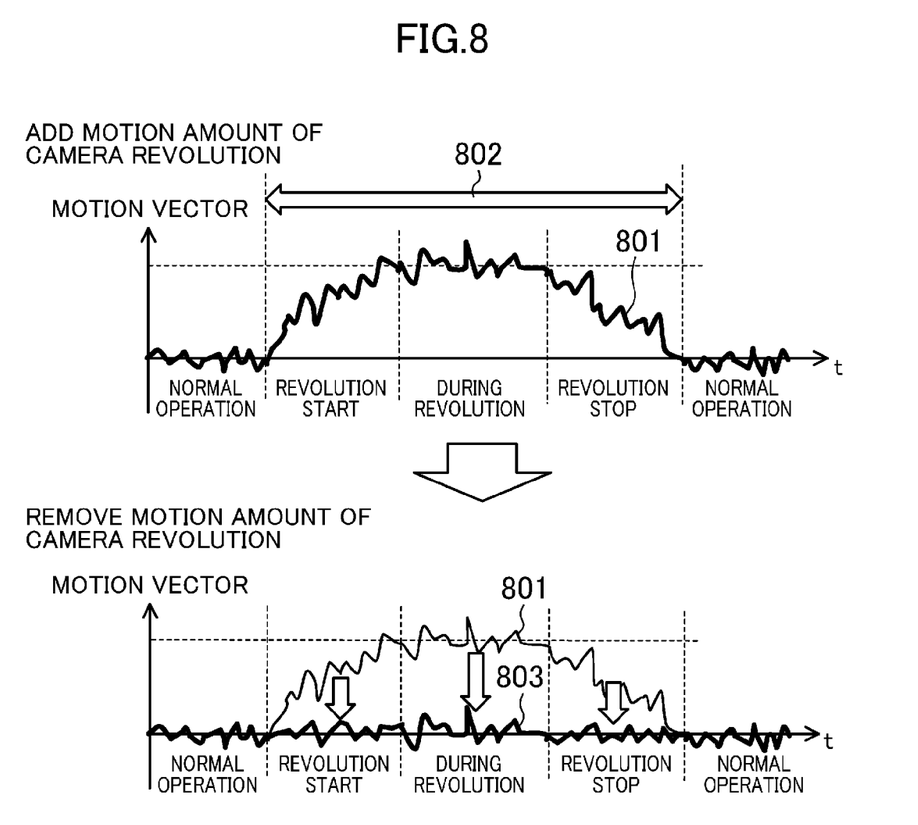
FIG. 8 shows graphs showing a motion vector of an entire image in a case where a camera revolves and a motion vector of the entire image from which a motion vector resulting from revolution of the camera has been removed.

Referring now to FIG. 8, operation in a case where the camera revolves in step S210 in FIG. 2 will be described. FIG. 8 shows a stabilization vector in a case where the camera revolves. In FIG. 8, reference character 801 denotes a vector determined for each frame, and reference character 802 denotes a period from when revolution of the camera starts to when the revolution of the camera stops. The stabilization vector in this period 802 is larger than the vector in normal operation because the amount of motion resulting from the revolution of the camera is added to the stabilization vector. Every time the camera revolves in the period 802, the revolution vector computing unit 109 computes a camera revolution amount Ms(n). Specifically, the camera revolution amount Ms(n) is represented by:

$$Ms(n)=(M(n) \times K+Ms(n-1) \times (1-K))/2$$

where M(n) is a vector computed by the image vector computing unit 106, Ms(n−1) is a camera revolution amount previously computed by the revolution vector computing unit 109, and K is a coefficient (e.g., 0.1). The difference between Ms(n) and M(n) is used as a stabilization vector of the camera, and image stabilization is performed, thereby compensating only for sway of the camera from which the motion amount of revolution of the camera has been removed as indicated by a line 803. To compute the vector Ms(n), an estimation filter such as a Kalman filter or pattern recognition, for example, may be used.

EXAMPLES OF APPLICATION

Figure 9:
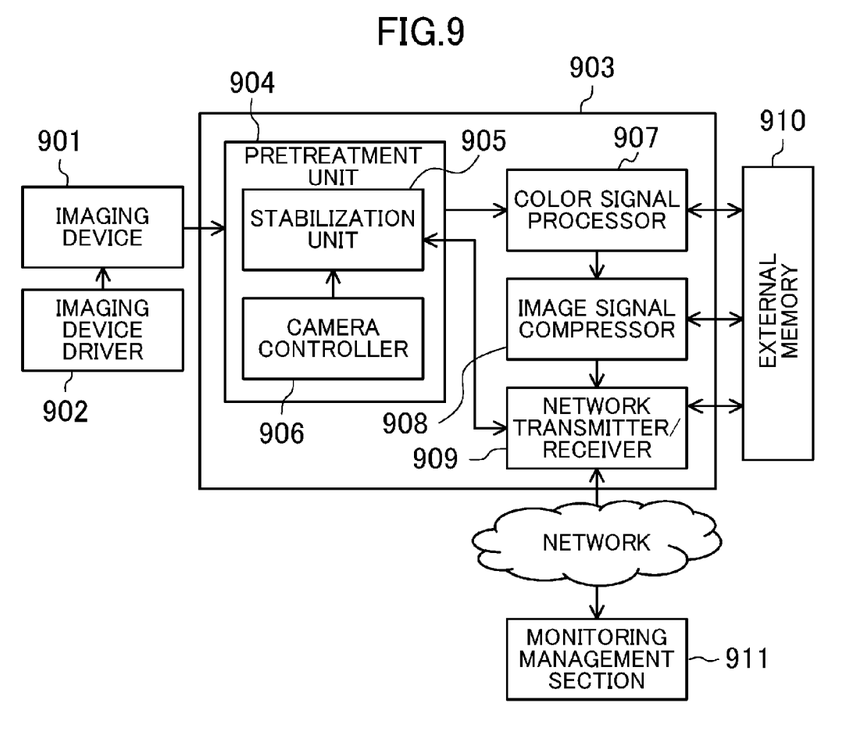
FIG. 9 is a diagram illustrating a network monitoring camera including the image stabilization system shown of FIG. 1.

FIG. 9 is a diagram illustrating a network monitoring camera including the image stabilization system of FIG. 1. This network monitoring camera includes an imaging device 901, an imaging device driver 902, an LSI section 903, an external memory 910, and a monitoring management section 911.

An image of a subject is formed in the imaging device 901, subjected to photoelectric conversion at the time of driving of the imaging device driver 902, and output as an analog signal. Then, the analog signal is subjected to processing such as amplification and noise reduction, and converted into a digital signal, and the digital signal is input to the LSI section 903. The LSI section 903 uses the external memory 910 as a work region, corrects an imaging signal converted into a digital signal in a digital signal pretreatment unit 904, which is the image stabilization system of FIG. 1, and outputs the resultant signal. In the digital signal pretreatment unit 904, camera information is input from a camera controller 906 to a stabilization unit 905, and external information is input from the monitoring management section 911 to the stabilization unit 905 through a network transmitter/receiver 909 by way of network. The digital signal pretreatment unit 904 obtains a motion vector of an entire image through steps S201-S210 shown in FIG. 2 based on input information, corrects the image according to the obtained motion vector, and outputs the corrected image. A color signal processor 907 generates a video signal made of a luminance signal and a color signal from the corrected signal, and outputs the video signal. An image signal compressor 908 compresses an image, and outputs compressed data to the network transmitter/receiver 909. The network transmitter/receiver 909 transmits the compressed data to the monitoring management section 911 by way of network. The monitoring management section 911 expands the received compressed data and performs monitoring.

What is claimed is:

1. An image stabilization system, comprising:
   a region vector detection unit configured to detect a motion vector of each of a plurality of regions in an image;
   a reliability determination unit configured to determine reliability of the motion vector of each of the regions;
   a region indicator configured to indicate, to the region vector detection unit, a new detection target region instead of a region whose motion vector is determined to have low reliability;
   an image vector computing unit configured to compute a motion vector of the entire image using a motion vector determined to have high reliability; and
   a stabilization unit configured to move an entire image to be output according to the motion vector of the entire image to compensate for sway of the image.

2. The image stabilization system of claim 1, further comprising:
   a luminance acquisition unit configured to acquire a luminance of each of the regions in the image, wherein
   the region indicator determines a region having a relatively high luminance as the new detection target region.

3. The image stabilization system of claim 1, further comprising:
   a frequency component acquisition unit configured to acquire a frequency component of each of the regions in the image, wherein
   the region indicator determines a region having a relatively high frequency component as the new detection target region.

4. The image stabilization system of claim 3, wherein
   the frequency component acquisition unit acquires the frequency component from autofocus information of an image capturing device configured to generate an image to be input to the image stabilization system.

5. The image stabilization system of claim 1, further comprising:
   a revolution determination unit configured to determine whether an image capturing device configured to generate an image to be input to the image stabilization system is revolving or not; and
   a revolution vector computing unit configured to compute a motion vector of the image resulting from revolution of the image capturing device, the revolution vector computing unit computing a motion vector based on a motion vector computed by the image vector computing unit and a motion vector immediately previously computed by the revolution vector computing unit, wherein
   the stabilization unit compensates for sway of the image by adding the motion vector computed by the revolution vector computing unit.

6. The image stabilization system of claim 5, wherein
   the revolution vector computing unit computes a motion vector of the image resulting from revolution of the image capturing device from when the image capturing device is instructed to stop revolution thereof to when the image capturing device actually stops the revolution.

7. The image stabilization system of claim 1, further comprising:
   an external information acquisition unit configured to acquire external information input to an image capturing device configured to generate an image to be input to the image stabilization system, wherein
   the region indicator determines the new detection target region based on the external information.

8. The image stabilization system of claim 7, wherein
   the external information is time information.

9. The image stabilization system of claim 7, wherein the external information is weather information.

10. The image stabilization system of claim 7, wherein the external information is quantity and direction of wind.

11. The image stabilization system of claim 7, wherein the region indicator records the external information and the new detection target region in association with each other, and if external information immediately previously acquired by the external information acquisition unit matches the recorded external information, determines a region associated with the recorded external information as the new detection target region.

12. A monitoring camera system, comprising:
the image stabilization system of claim 1.

13. A method for image stabilization, comprising:
region vector detection of detecting a motion vector of each of a plurality of regions in an image;
reliability determination of determining reliability of the motion vector of each of the regions;
region indication of indicating, as a region whose motion vector is to be detected in the region vector detection, a new detection target region instead of a region whose motion vector is determined to have low reliability;
image vector computation of computing a motion vector of the entire image using a motion vector determined to have high reliability; and
stabilization of moving an entire image to be output according to the motion vector of the entire image to stabilize compensate for sway of the image.

14. The method of claim 13, further comprising:
luminance acquisition of acquiring a luminance of each of the regions in the image, wherein
in the region indication, a region having a relatively high luminance is determined as the new detection target region.

15. The method of claim 13, further comprising:
frequency component acquisition of acquiring a frequency component of each of the regions in the image, wherein
in the region indication, a region having a relatively high frequency component is determined as the new detection target region.

* * * * *